US008251527B1

(12) United States Patent
Freier (10) Patent No.: US 8,251,527 B1
(45) Date of Patent: Aug. 28, 2012

(54) LIGHT DUCT BEND (75) Inventor: David G. Freier, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 13/025,251

(22) Filed: Feb. 11, 2011

(51) Int. Cl.
G02B 6/26 (2006.01)

(52) U.S. Cl. ......... 359/858; 385/32; 385/147; 359/852; 359/855

(58) Field of Classification Search ............... 350/96.24; 385/24, 130; 359/591–598, 861; 362/551
See application file for complete search history.

(56) References Cited

U.S. PATENT DOCUMENTS

| 4,956,759 | A | | 9/1990 | Goldenberg et al. |
| 4,964,692 | A | * | 10/1990 | Prescott ........................ 385/117 |
| 5,553,177 | A | | 9/1996 | Hering et al. |
| 5,604,837 | A | * | 2/1997 | Tanaka ........................... 385/147 |
| 5,988,843 | A | | 11/1999 | Handel |
| 6,149,289 | A | * | 11/2000 | Kuramitsu et al. ........... 362/551 |
| 6,419,289 | B1 | | 11/2000 | Kuramitsu et al. |
| 6,314,219 | B1 | | 11/2001 | Zhang et al. |
| 6,560,393 | B2 | * | 5/2003 | Roberts ......................... 385/130 |
| 6,819,687 | B1 | | 11/2004 | Fein |
| 7,020,358 | B2 | * | 3/2006 | Tabuchi et al. .................. 385/24 |
| 7,286,296 | B2 | | 10/2007 | Chaves et al. |
| 7,496,254 | B2 | * | 2/2009 | Miyadera et al. ................ 385/32 |
| 7,982,956 | B2 | * | 7/2011 | Kinney et al. .................. 359/591 |
| 2005/0053346 | A1 | | 3/2005 | Deng et al. |
| 2005/0057828 | A1 | * | 3/2005 | Read ............................. 359/858 |
| 2005/0073756 | A1 | * | 4/2005 | Poulsen ........................ 359/861 |
| 2005/0220680 | A1 | | 10/2005 | Ma et al. |
| 2008/0013680 | A1 | * | 1/2008 | Singer et al. ..................... 378/34 |
| 2008/0159690 | A1 | | 7/2008 | Poovey |
| 2008/0239526 | A1 | * | 10/2008 | Takeda et al. ................. 359/833 |

FOREIGN PATENT DOCUMENTS

JP 2003-240356 8/2003

OTHER PUBLICATIONS

Ya Yan Lu, Pui Lin Ho, "Beam propagation modeling of arbitrarily bent waveguides", City University of Hong Kong, Photonic Technoloy Letters, IEEE, Issue: 12, pp. 1698-1700, Issn: 1041-1135, Dec. 2002.*

* cited by examiner

Primary Examiner — Clayton E LaBalle
Assistant Examiner — Kevin Butler (57) ABSTRACT Generally, the present disclosure provides a light duct bend used in a mirror-lined light duct system. In one aspect, the light duct bend includes an input region having a first propagation direction, an output region having a second propagation direction disposed at a bend angle to the first propagation direction, and a transition region connecting the input region to the output region. The transition region includes a plurality of vanes that subdivide the duct into channels, which can reduce the loss and/or disruption of collimation about one or more bends in the light duct system.

25 Claims, 6 Drawing Sheets

LIGHT DUCT BEND

BACKGROUND

The long-distance transport of visible light can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (i.e., air) that leads to both lower attenuation and longer lifetimes, and a potentially lower weight per unit of light flux transported. Solid fibers include the advantage of configuration flexibility, which can result in relatively tight bends with low light loss. While the advantages of mirror-lined ducts may appear overwhelming, fibers are nevertheless frequently selected because of the practical value of assembling light conduits in much the same fashion as plumbing.

What is needed is a technique to construct efficient low-loss light-ducting systems in a fashion similar to plumbing, or heating, ventilating and air-conditioning (HVAC) ductwork.

SUMMARY

Generally, the present description relates to light duct bends that can be used for more efficient transport of partially collimated light within a light duct. In one aspect, the present disclosure provides a light duct bend that includes a light duct having an inner sidewall, an outer sidewall, a top, and a bottom, forming an interior cavity having specular reflective surfaces. The light duct bend further includes an input region in the light duct, having a first light propagation direction, an output region in the light duct, having a second light propagation direction forming a bend angle θ with the first light propagation direction, and a transition region connecting the input region to the output region, wherein the inner sidewall follows an inner radius and the outer sidewall follows an outer radius. The light duct bend still further includes a plurality of vanes separating the transition region into channels, each of the plurality of vanes following an associated vane radius between the inner radius and the outer radius, wherein a major portion of a partially collimated input light beam having a divergence angle that enters the input region, exits the light duct from the output region within the divergence angle.

In another aspect, the present disclosure provides a light duct assembly that includes a light source capable of injecting a partially collimated input light beam into a light duct, the light duct having an inner sidewall, an outer sidewall, a top, and a bottom, forming an interior cavity having specular reflective surfaces. The light duct further includes an input region in the light duct having a first light propagation direction, an output region in the light duct having a second light propagation direction forming a bend angle θ with the first light propagation direction, and a transition region connecting the input region to the output region, wherein the inner sidewall follows an inner radius, and the outer sidewall follows an outer radius. The transition region further includes a plurality of vanes separating the transition region into channels, each of the plurality of vanes following an associated vane radius between the inner radius and the outer radius, wherein a major portion of the partially collimated input light beam having a divergence angle that enters the input region, exits the light duct from the output region within the divergence angle.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides a novel construction for a bend in a mirror-lined light duct. In one particular embodiment, the present disclosure addresses the ability to conduct light with only minor loss and/or disruption of collimation about one or more bends in the ductwork system. The described light duct bend can be applied to both in-plane and out-of-plane bends of an arbitrary angle. In one particular embodiment, the light duct bend can be more effective by using very high efficiency mirrors such as, for example, Vikuiti™ Enhanced Specular Reflector (ESR) film available from 3M Company. ESR film can be readily bent about a single axis of curvature, such as the curvatures common in rectangular cross-section light ducts.

Architectural daylighting using mirror-lined light ducts can deliver sunlight deep into the core of multi-floor buildings. Such mirror-lined light ducts can be uniquely enabled by the use of 3M optical films, including mirror films such as ESR film, that have greater than 98% specular reflectivity across the visible spectrum of light. Architectural daylighting is a multi-component system that includes a device for collecting sunlight, and light ducts and extractors for transporting and distributing the sunlight within the building. The typical benefits of using sunlight for interior lighting can include a reduction of energy for office lighting by an average of 25%, improved light quality due to the full spectrum light delivered, and is often more pleasing to office occupants. One of the components of the light ducting portion of the system is the ability to bend the duct up to 90 degrees or more, to accommodate building features that would prevent a straight run of the duct in the building. Without the ability to turn the light efficiently via corners or bends in the duct, any architectural daylighting system would be limited to straight ducts only, which could significantly reduce the attractiveness of using sunlight for interior lighting. Bends that can efficiently re-direct the light in the duct are needed.

Figure 1A:
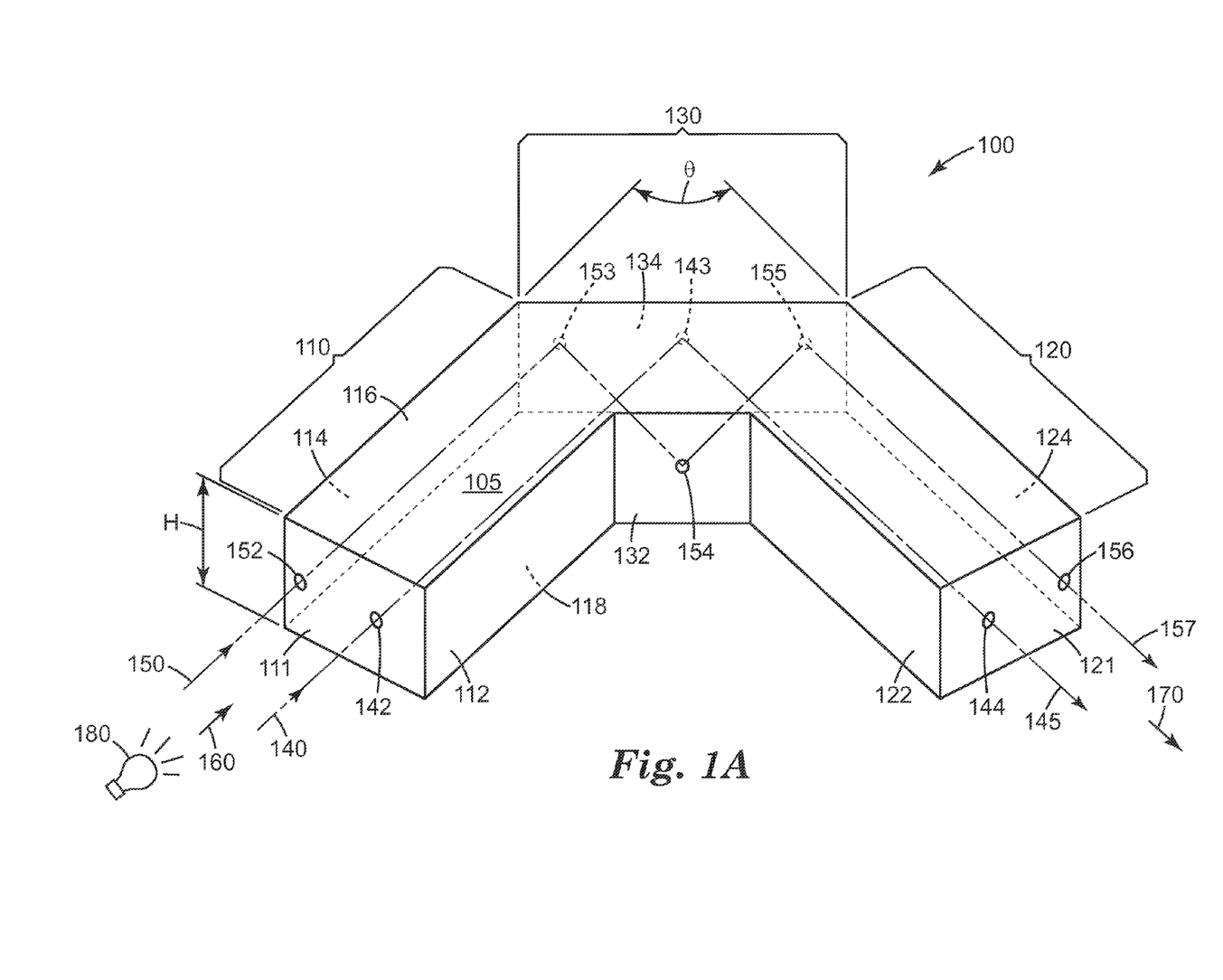
FIG. 1A is a perspective view of a light duct bend.

FIG. 1A shows a perspective view of a light duct bend 100 in a mirror-lined light duct having an interior cavity 105 with a duct height "H", according to one aspect of the disclosure. All of the surfaces of the interior cavity 105 are highly reflective surfaces, for efficient light propagation through the light duct. The designs provided in FIG. 1A can be an efficient light duct bend for well-collimated light.

The light duct bend 100 includes an input region 110, an output region 120, and a transition region 130 between them. The input region 110 includes an input inner sidewall 112, an input outer sidewall 114 opposite the input inner sidewall 112, a top 116 and a bottom 118. The top 116 and bottom 118 are each continuous over the input region, the transition region, and the output region. The input region 110 further includes an input surface 111 having an input cross-sectional area "$A_i$" and a first light propagation direction 160 perpendicular to the input surface 111. The output region 120 includes an output inner sidewall 122, an output outer sidewall 124 opposite the output inner sidewall 122, the top 116 and the bottom 118. The output region 120 further includes an output surface 121 having an output cross-sectional area "$A_o$" and a second light propagation direction 170 perpendicular to the output surface 121. In one particular embodiment, the input cross-sectional area $A_i$ can be equal to the output cross-sectional area $A_o$, although in some cases, the cross-sectional areas can be different.

The transition region 130 includes a transition inner sidewall 132 connecting the input inner sidewall 112 to the output inner sidewall 122, a transition outer sidewall 134 opposite the transition inner sidewall 132 and connecting the input outer sidewall 114 to the output outer sidewall 124, the top 116 and the bottom 118. As shown in FIG. 1A, the first propagation direction 160 and the second propagation direction 170 form a bend angle θ between them, and both the transition inner sidewall 132 and the transition outer sidewall 134 are planar surfaces. The bend angle θ can be any in-plane angle or out-of-plane angle, including both acute and obtuse angles. In some cases, the bend angle θ can range from about 15 degrees to about 165 degrees, or from about 45 degrees to about 135 degrees, or from about 60 degrees to about 120 degrees, or about 90 degrees.

In one particular embodiment, collimated light entering the input surface 111 along the first propagation direction 160 will experience one or more reflections from the interior walls of the transition region 130, resulting in a net change in direction along the second propagation direction 170. A light source 180 injects light beams into the light duct bend 100. Exemplary first light beam 140 travelling along first propagation direction 160 enters input surface 111 at first position 142, reflects from transition outer sidewall 134 of transition region 130 at second position 143, and exits from output surface 121 at third position 144 along second propagation direction 170, as first redirected light beam 145. Exemplary second light beam 150 travelling along first propagation direction 160 enters input surface 111 at fourth position 152, reflects from transition outer sidewall 134 of transition region 130 at fifth position 153, reflects from transition inner sidewall 132 of transition region 130 at sixth position 154, reflects again from transition outer sidewall 134 of transition region 130 at seventh position 155, and exits from output surface 121 at eighth position 156 along second propagation direction 170, as second redirected light beam 157. The efficiency of transmission through light duct bend 100 will be high due to the small number of reflections, and the transmitted light will remain collimated along the second propagation direction 170.

The number of reflections through the light duct bend 100 will increase as the perpendicular separation of the transition inner sidewall 132 and the transition outer sidewall 134 decreases, resulting in lower transmission, but an odd number of reflections will still result, ensuring that the transmitted beam will remain collimated along the propagation direction. Insofar as high efficiency and the maintenance of collimation are concerned, the performance is nearly ideal for perfectly-collimated input light.

Figure 1B:
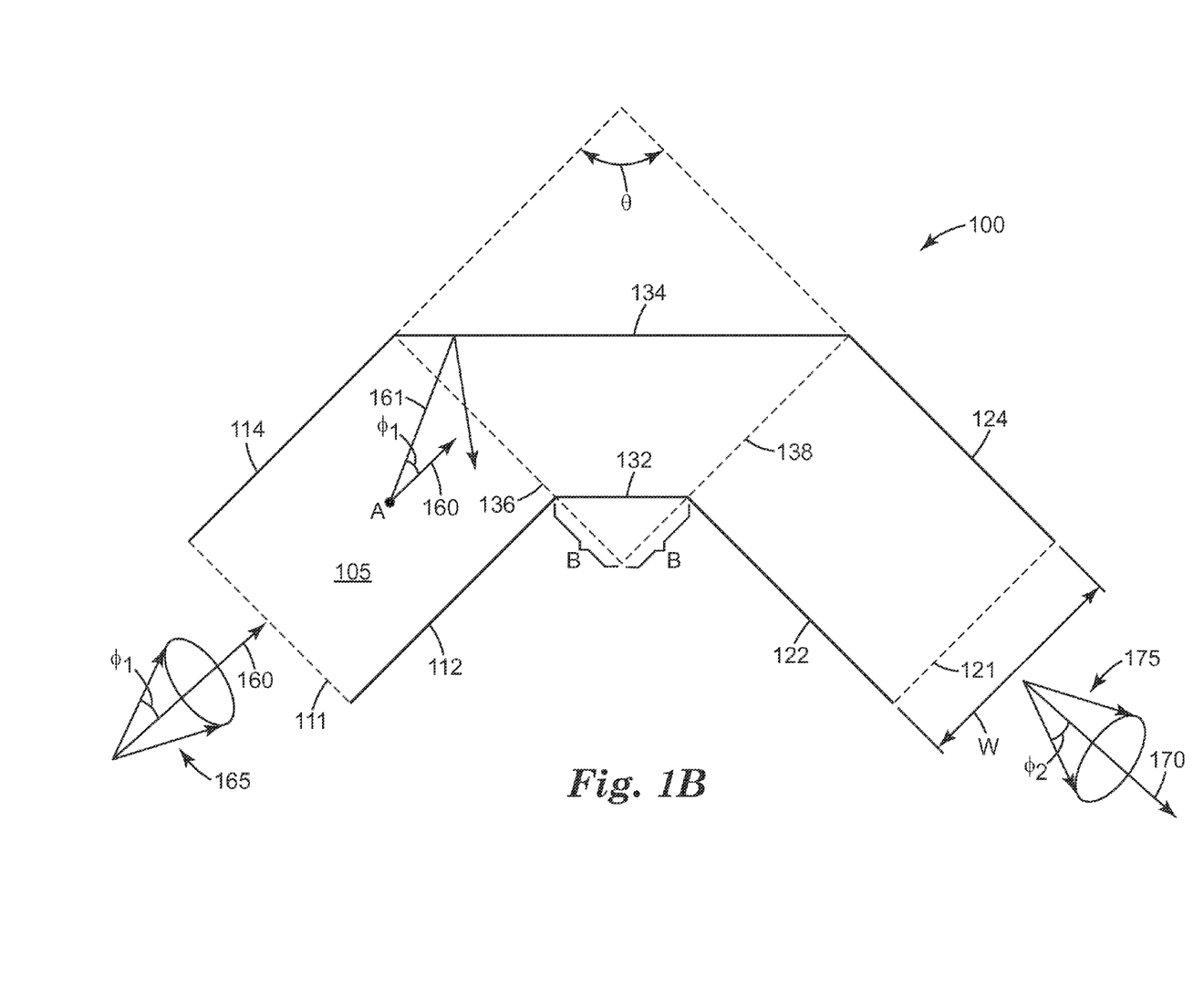
FIG. 1B is a cross-sectional top view of the light duct bend of FIG. 1A.

FIG. 1B is a cross-sectional top view of the light duct bend 100, according to one aspect of the disclosure. FIG. 1B shows an example of how the performance of the light duct bend 100 can diminish substantially for less-than-perfectly collimated input light. Like numbers in FIGS. 1A-1B are in correspondence, and light duct bend 100 is further shown to have a duct width "W" and a bend distance "B". A light source (not shown) injects light beams into the light duct bend 100. In one aspect, FIG. 1B shows a partially collimated input light 165 that enters input surface 111 of light duct bend 100 along first propagation direction 160. The partially collimated input light 165 passes through a transition region input surface 136 and a transition region output surface 138. After traversing the light duct bend 100, a partially collimated output light 175 exits from output surface 121 of light duct bend 100 along second propagation direction 170.

In one particular embodiment, partially collimated input light 165 includes a cone of light having a propagation direction within an input light divergence angle $\phi_1$ from first propagation direction 160. The divergence angle $\phi_1$ of partially collimated input light 165 can be symmetrically distributed in a cone around the first propagation direction 160, or it can be non-symmetrically distributed. In some cases, the divergence angle $\phi_1$ of partially collimated input light 165 can range from about 0 degrees to about 30 degrees, or from about 0 degrees to about 25 degrees, or from about 0 degrees to about 20 degrees. In one particular embodiment, the divergence angle $\phi_1$ of partially collimated input light 165 can be about 23 degrees, Partially collimated output light 175 includes a cone of light having a propagation direction within an output light divergence angle $\phi_2$ from second propagation direction 170. In one particular embodiment, the input light divergence angle $\phi_i$ can be equal to the output light divergence angle $\phi_2$, and collimation through the light duct bend 100 is preserved. Generally, however, collimation of the light will degrade (i.e., the performance of the light duct bend 100 will diminish) after passing through the light duct bend 100 and the output light divergence angle $\phi_2$ will be greater than the input light divergence angle $\phi_i$.

Another way that the performance of the light duct bend 100 can diminish is by reflection of a portion of the input light back through the input surface 111. For example, a light beam 161 within the input light divergence angle $\phi_i$ of the first propagation direction 160 can travel from position "A", pass through the transition region input surface 136, reflect from transition outer sidewall 134, and return back through the transition region input surface 136 and exit input surface 111.

In one particular embodiment, the transition region includes a series of parallel, vertical, mirror-lined channels that can form quarter-circle arcs in the horizontal plane. Light within these narrow channels turns the corner via a series of multiple reflections, each of which only slightly alters the direction of propagation. In the limit, for a large number of channels, the degree of collimation of the output light is identical to that input light.

Since there can be many light reflections through the channels, the efficiency of transmission can degrade due to poor reflectivity of the mirrored surfaces included in the transition region. This degradation can be minimized by the use of highly efficient mirrors, such as, for example, Vikuiti™ Enhanced Specular Reflector (ESR) film available from 3M Company, which possesses a reflectivity as high as 99.5% substantially independent of incidence angle. It is to be understood that even with 99.5% reflectivity, the efficiency of transmission can degrade for sufficiently small width-to-radius ratios of the bend. In one particular embodiment, the proper design of a transition region involves a compromise between the desire to maintain the input collimation (favoring small width-to-radius ratios), and the desire to maintain high efficiency (favoring larger width-to-radius ratios).

Generally, a balance between the desired collimation and efficiency can result in conveying a major portion of the light that enters the light duct bend through to exit the light duct bend within the divergence angle. In other words, a major portion of a partially collimated input light beam having a divergence angle that enters the light duct, exits the light duct within the divergence angle. In some cases, the major portion is a substantial portion of the partially collimated light input beam, or a sufficient amount for acceptable daylighting in portions lighted beyond the bend, or an amount such that any loss of light in daylighting in portions beyond the bend is generally imperceptible to building occupants in that area. In one particular embodiment, the major portion of the input light can be greater than about 80 percent of the input light, or greater than about 85 percent of the input light, or greater than about 88 percent of the input light, or even greater than about 90 percent of the input light.

Figure 2A:
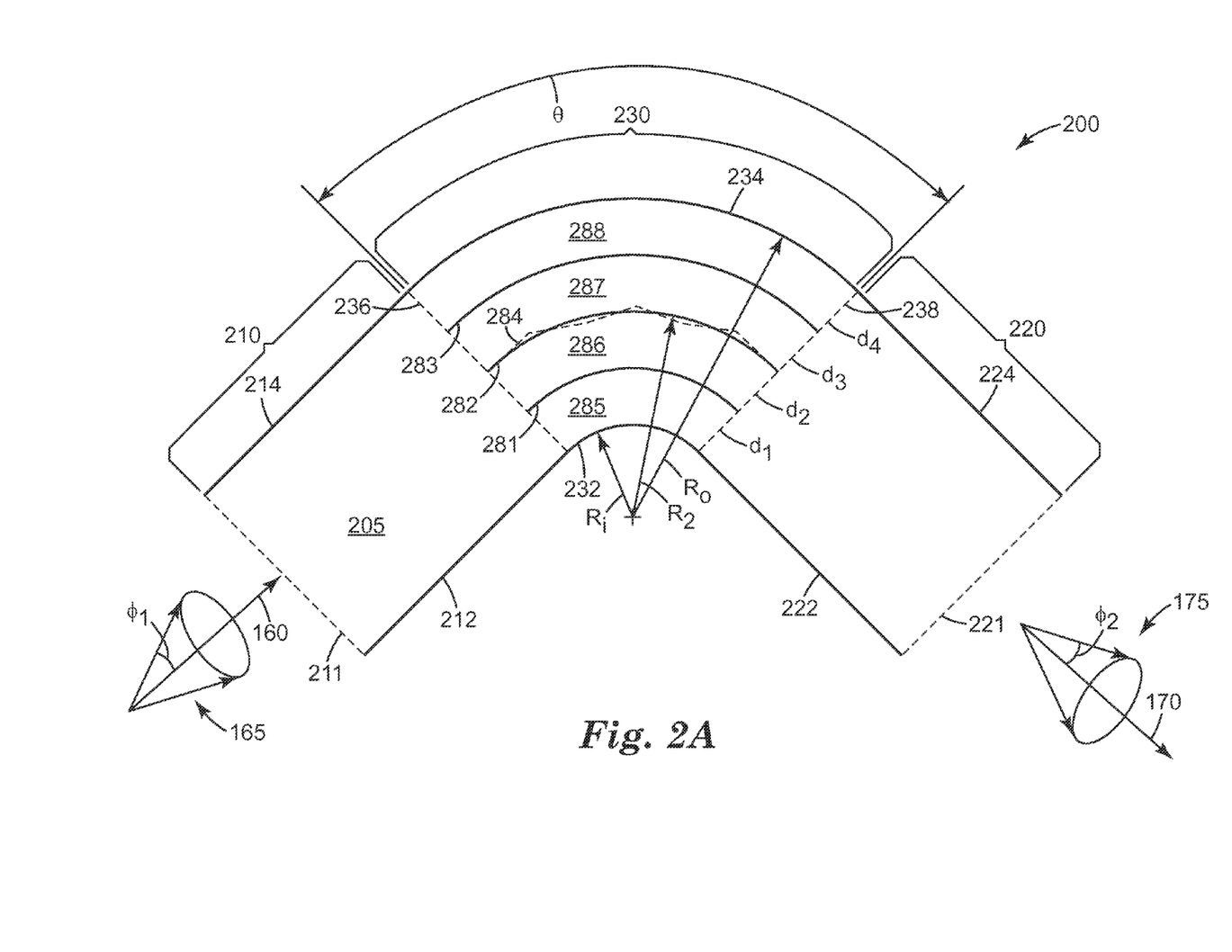
FIG. 2A is a cross-sectional top view of a light duct bend.

FIG. 2A is a cross-sectional top view of a light duct bend 200 that can demonstrate improved transport of a partially collimated input light 165, according to one aspect of the disclosure. Each of the elements 205-238 shown in FIG. 2A correspond to like-numbered elements 100-138 shown in FIGS. 1A-1B, which have been described previously. For example, the description of interior cavity 105 in FIG. 1A corresponds to the description of interior cavity 205 in FIG. 2A, and so on. A light source (not shown) can inject light beams into the light duct bend 200.

In FIG. 2A, transition region 230 includes transition inner sidewall 232, transition outer sidewall 234, and a plurality of vanes 281-283 between the inner and outer sidewalls 232, 234. There can be any desired number of vanes within the transition region 230; however, in some cases the number of vanes can be between about 1 and about 20, between 3 and about 15, or between about 5 and about 10. In one particular embodiment, about 7 vanes can result in an efficient transport of partially collimated input light.

The transition region 230 is thereby separated into channels 285-288. A first channel 285 is formed between transition inner sidewall 232 and a first vane 281, a second channel 286 is formed between first vane 281 and a second vane 282, a third channel 287 is formed between second vane 282 and a third vane 283, and a fourth channel 288 is formed between the third vane 283 and the transition outer sidewall 234. In one particular embodiment, shown in FIG. 2A, inner sidewall 232 is curved around an inner radius Ri, outer sidewall 234 is curved around an outer radius Ro, and each of the plurality of vanes 281-283 are curved around a respective radius, such as, for example, second vane 282 curved around radius R2 as shown in FIG. 2A. In one particular embodiment (not shown), each of the plurality of vanes 281-283, the inner sidewall 232 and the outer sidewall 234 can instead approximate a curved surface by being segmented into a plurality of linear portions, as shown, for example, by a segmented vane 284 approximation of second vane 282, and as known to those of skill in sheet-metal forming arts.

Each of the first through fourth channels 285-288 includes a respective channel width d1-d4 extending from transition input surface 236 to transition output surface 238, through the transition region 230. In some cases, each of the respective channel widths d1-d4 are the same width throughout the transition region 230, as shown in FIG. 2A. In some cases, at least one of the channel widths d1-d4 varies throughout the transition region 230, such as, for example, when the transition output surface 238 may be larger than the transition input surface 236 (not shown). In some cases, at least one of the channel widths d1-d4 is different from at least one of the remaining channel widths, such as, for example, a channel width that increases with increasing radius, e.g., d1<d2<d3<d4, as shown elsewhere.

Figure 2B:
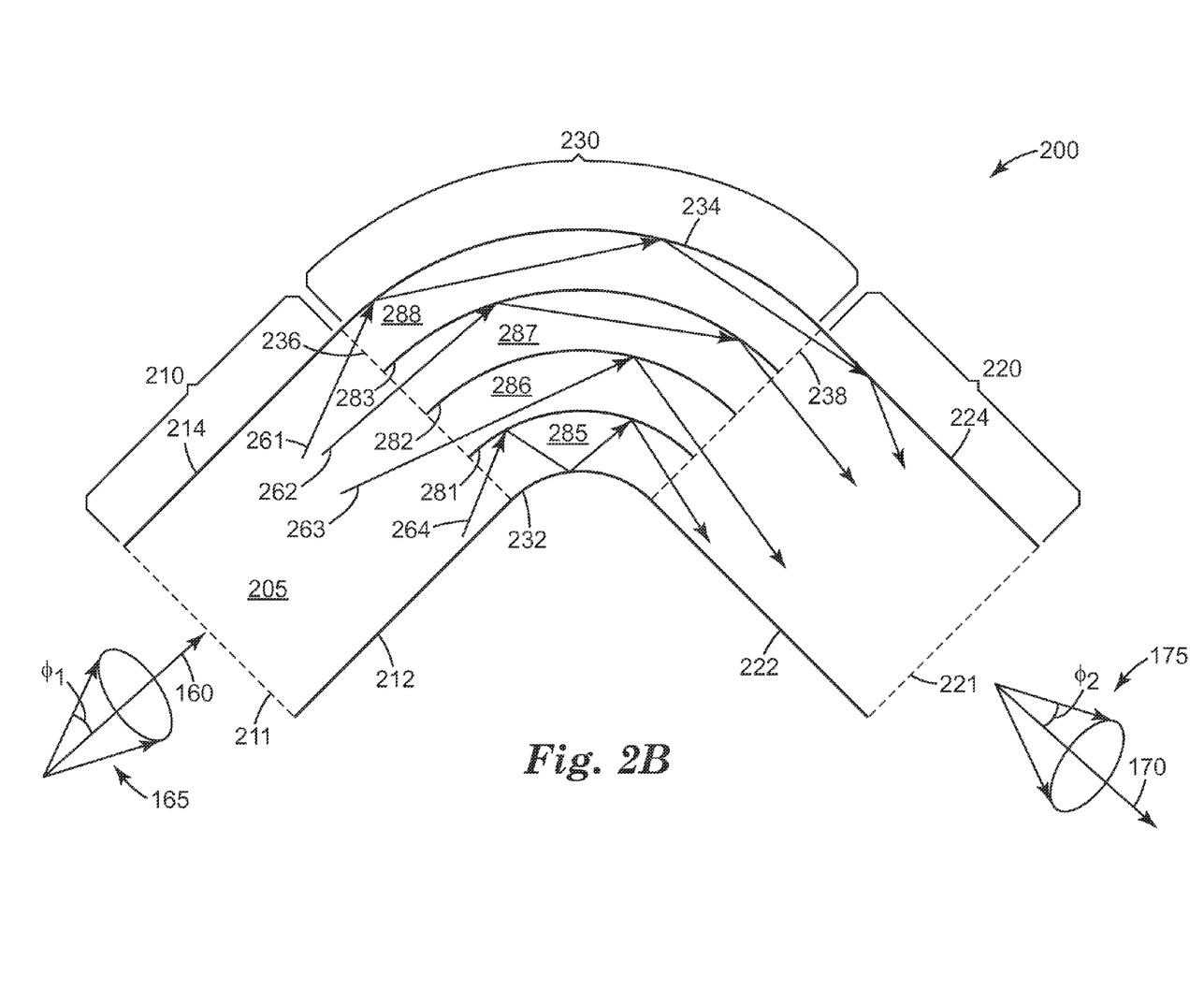
FIG. 2B is a schematic top view of the light duct bend of FIG. 2A.

FIG. 2B is a schematic top view of the light duct bend of FIG. 2A, according to one aspect of the disclosure. A light source (not shown) injects light beams into the light duct bend 200. In FIG. 2B, the path of representative light beams within partially collimated input light 165 passing through transition region 230 is shown. Each of the elements 205-288 shown in FIG. 2B correspond to like-numbered elements 205-288 shown in FIGS. 2A, which have been described previously. For clarity, some elements shown in FIG. 2A do not appear in FIG. 2B; however, it is to be understood that the corresponding elements in FIGS. 2A-2B are identical.

Each representative light beam within partially collimated input light 165 enters the transition region 230 through transition input surface 236 and exits transition region 230 through transition output surface 238. In some cases, the degree of collimation of the partially collimated input light 165 is generally retained in the partially collimated output light 175, although the propagation direction has been changed from the first propagation direction 160 to the second propagation direction 170, as described elsewhere.

In one particular embodiment, a first light beam 261 specularly reflects twice from transition outer sidewall 234 and specularly reflects again from output outer sidewall 224 of output region 220, after leaving transition output surface 238. A second light beam 262 specularly reflects twice from third vane 285 and exits transition region 230 through transition output surface 238. A third light beam 263 specularly reflects once from second vane 282 and exits transition region 230 through transition output surface. A fourth light beam 264 specularly reflects twice from first vane 281 and once from transition inner sidewall 232.

Figure 3:
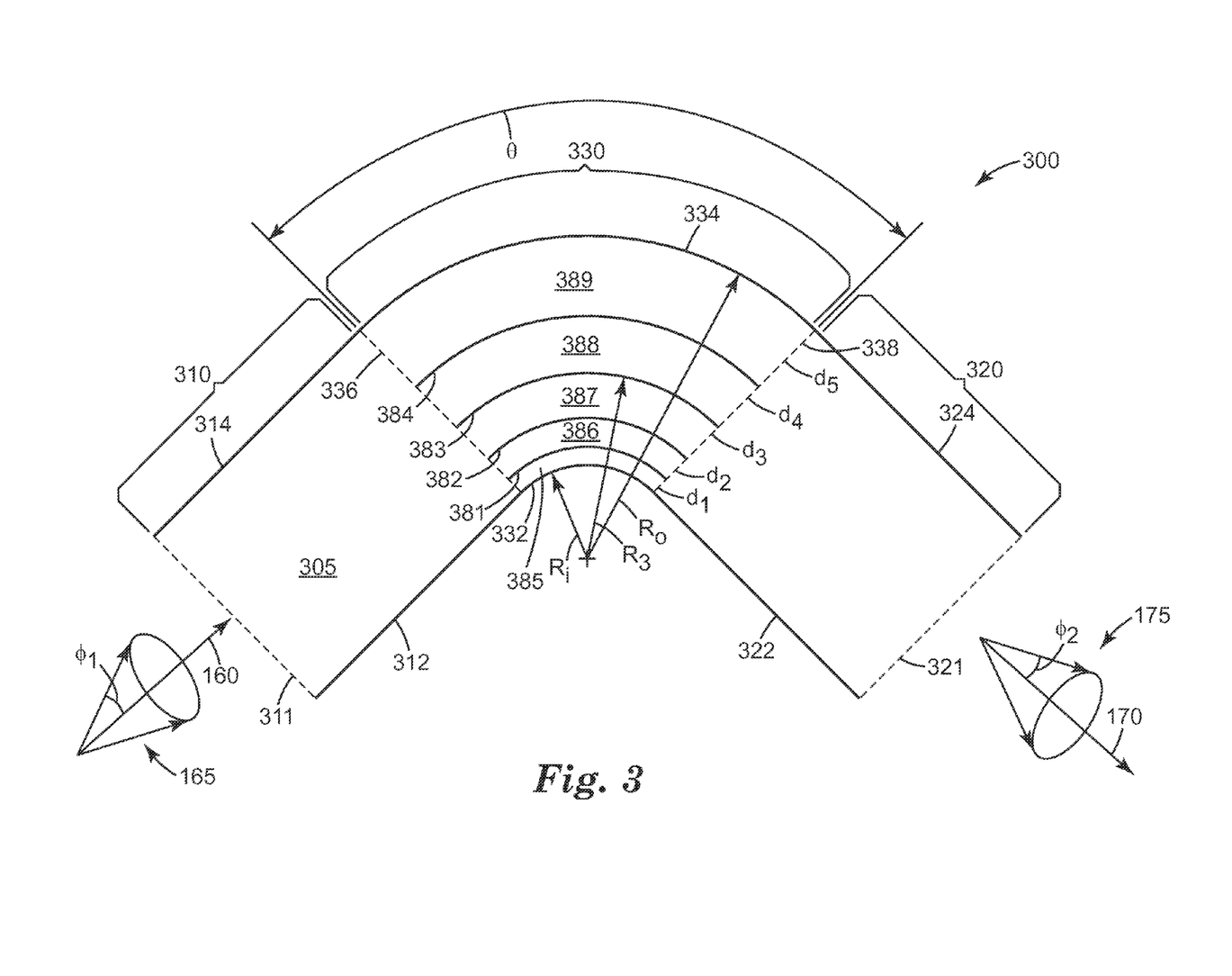
FIG. 3 is a cross-sectional top view of a light duct bend.

FIG. 3 is a cross-sectional top view of a light duct bend 300, according to one aspect of the disclosure. Each of the elements 305-338 shown in FIG. 3 correspond to like-numbered elements 205-238 shown in FIGS. 2A-2B, which have been described previously. For example, the description of interior cavity 205 in FIG. 2A corresponds to the description of interior cavity 305 in FIG. 3, and so on. A light source (not shown) can inject light beams into the light duct bend 300.

In FIG. 3, the width of the channel formed between adjacent vanes is varied as the distance of the vane from the inner sidewall is increased. In some cases, a varying channel width can improve the retention of the degree of collimation through the light duct bend 300. Each of the transition inner sidewall 332, first through fourth vanes 381-384, and transition outer sidewall 334 have an associated radius R1, R1 through R4, and Ro, as described elsewhere.

Since the optical performance typically depends strongly upon the ratio of width to radius, the individual channel widths can be selected so as to maintain approximately the same width-to-radius ratio for each channel. This is accomplished by positioning the vanes at radii which are exponentially distributed between the minimum and maximum radius of the connecting structure. For example, as shown in FIG. 3, the third vane 383 follows the third radius R3 throughout the transition region 330, from the transition input surface 336 to the transition output surface 338. In one particular embodiment, the channel widths d1 through d5 of each of the first through fifth channels 385 through 389, respectively, can vary such that the width of the channel divided by the radius of the outer vane forming the channel is constant, for example, d1/R1=d2/R2=d3/R3=d4/R4=d5/Ro.

Figure 4:
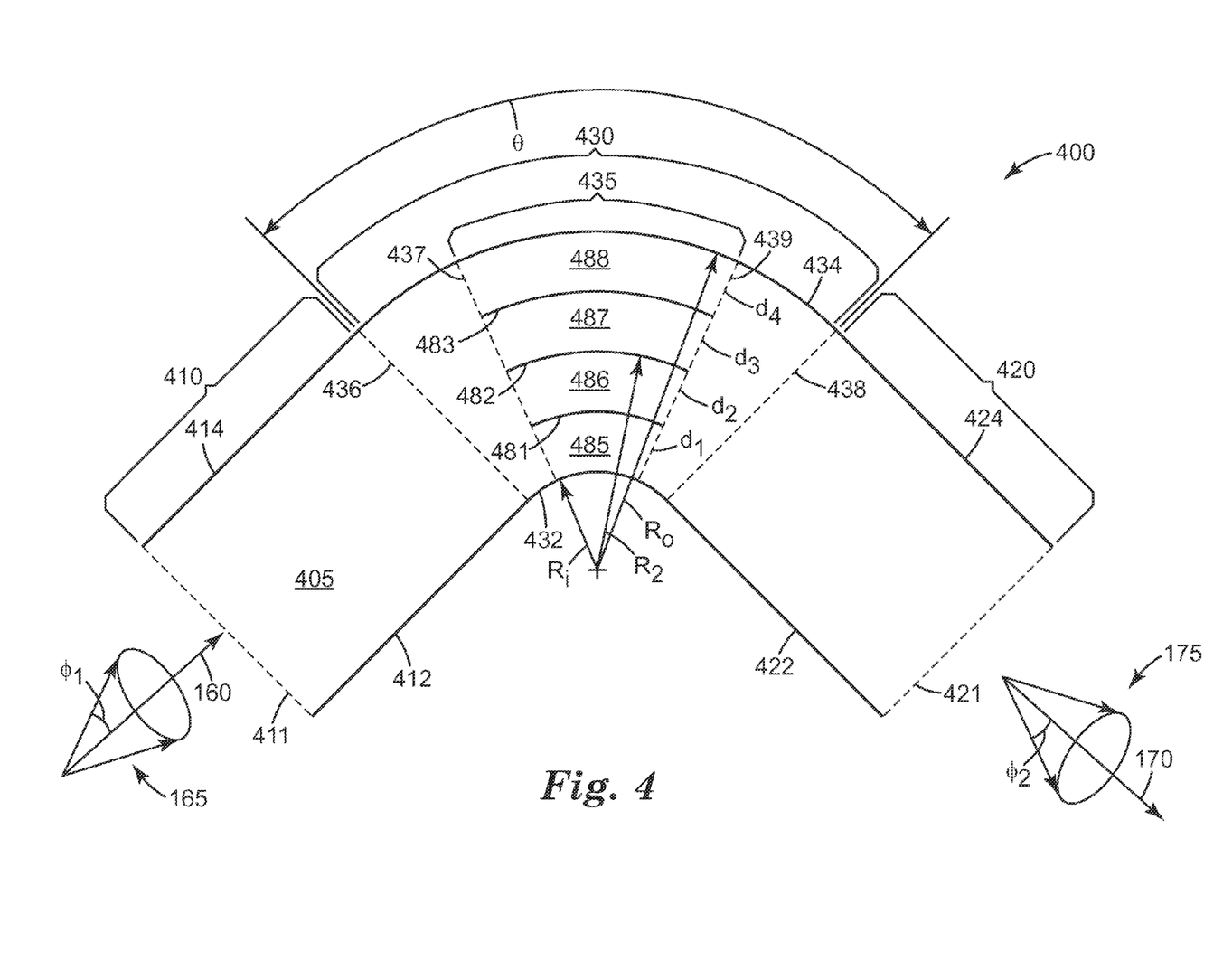
FIG. 4 is a cross-sectional top view of a light duct bend.

FIG. 4 is a cross-sectional top view of a light duct bend 400, according to one aspect of the disclosure. Each of the elements 405-488 shown in FIG. 4 correspond to like-numbered elements 205-288 shown in FIGS. 2A-2B, which have been described previously. For example, the description of interior cavity 205 in FIG. 2A corresponds to the description of interior cavity 405 in FIG. 4, and so on. A light source (not shown) can inject light beams into the light duct bend 400.

In FIG. 4, first through fourth channels 485-488 extend only a portion 435 of the way through transition region 430. In some cases, adequate retention of collimation from partially collimated input light 165 to partially collimated output light 175 can be accomplished by reducing the channel length so that the distance between a channel input surface 437 and a channel output surface 439 is less than the distance between the transition input surface 436 and the transition output surface 438, as shown in FIG. 4.

EXAMPLES

A ray-trace analysis of the performance of a light duct bend was performed by launching a series of light beams into exemplary light duct bend designs at different angles, to determine the relative efficiency of light transport through the light duct bend.

Example 1

Light Duct Bend Efficiency of a Design Similar to FIGS. 1a-1b

An incident angular distribution of light beams was launched into the input surface 111 of light duct 100. The duct width "W", duct height "H", and bend distance "B" were normalized so that W=1.0, H=0.75 and B=0.5. The light beams were substantially (94.0%) contained within $\phi1$=23 degrees (i.e., partially collimated input light 165) of the first propagation direction 160. For this $\phi1$=23 degree collimation, only 86.9% of the incident light beams entered the output region 120, 11.7% was reflected back through the input region 110, and 1.4% was absorbed by the interior cavity 405 (whose reflectivity was assumed to be approximately 99.5%). Of the 86.9% that was transmitted, 0.903×86.9%=78.5% remained within $\phi2$=23 degrees (i.e., partially collimated output light 175) of the second propagation direction 170. The remaining 0.097×86.9=8.4% was transmitted at steep angles in the output region 120.

Example 2

Light Duct Bend Efficiency of a Design Similar to FIG. 3

An incident angular distribution of light beams was launched into the input surface 311 of light duct bend 300. The duct width "W", duct height "H", and inner radius "ri" were normalized so that W=1.0, H=0.75 and Ri=0.5. The light duct bend 300 was constructed using 6 vanes (forming 7 channels), and the channel width/vane radius ratio was about 12. The light beams were substantially (94.0%) contained within $\phi1$=23 degrees (i.e., partially collimated input light 165) of the first propagation direction 160. For this $\phi1$=23 degree collimation, 96.9% of the incident light beams entered the output region 320, none was reflected back through the input region 310, and 3.1% was absorbed by the interior cavity 305. Of the 96.9% transmitted, 0.853×96.9%=82.7% remained within $\phi2$=23 degrees (i.e., partially collimated output light 175) of the second propagation direction 170. The remaining 0.147×96.9%=14.2% was transmitted at steep angles in the output region 120. This represented more light beyond 23 degrees than for the simple construction of Example 1 (8.4%); however, its divergence from within the 23-degree cone was substantially less.

A reasonable figure of merit (FOM) for assessing the efficient retention of collimation can be the power within a target cone (i.e., 23 degrees in our analysis) within the exit duct (output region 320), divided by the power within the same target cone within the entrance duct (input region 310). This FOM is 78.5%/94.0%=83.5% for the simple construction of Example 1, and 82.7%/94.0%=87.9% for the embodiment described in Example 2. Of perhaps secondary relevance, the divergence of the light transmitted outside of the target cone is substantially less for the embodiment described in Example 2, and all of the light leaving the connecting structure continues to move in the forward direction down the exit duct.

Constructions similar to that depicted in FIG. 3 are contemplated for other-than 90-degree bends, where the inner and outer boundaries of the transition region and the parallel vanes contained between them comprise other than quarter circles in the horizontal plane. The retention of collimation for such other embodiments are expected to scale approximately linearly with the net angle of the bend accomplished. The bend depicted in FIG. 3 is an in-plane bend, occurring in the plane of the wide axis of the entrance and exit ducts. Analogous constructions are contemplated for out-of-plane bends of arbitrary angle, where the parallel vanes form circular arcs in the plane of the short axis of the entrance and exit ducts.

Additional embodiments can be evaluated by techniques known to those of skill in the art, using alternate ray-trace methods better suited to the curved geometries, varying the number of channels to identify optimum designs, evaluating the influence to mirror reflectivities, and explicitly considering other than 90-degree and both in-plane and out-of-plane bends.

Although the present invention has been described with reference to preferred embodiments, workers skilled in the art will recognize that changes may be made in form and detail without departing from the spirit and scope of the invention.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A light duct bend, comprising:
   a light duct having an inner sidewall, an outer sidewall, a top, and a bottom, forming an interior cavity having specular reflective surfaces;
   an input region in the light duct, having a first light propagation direction;
   an output region in the light duct, having a second light propagation direction forming a bend angle θ with the first light propagation direction;
   a transition region connecting the input region to the output region, wherein the inner sidewall follows an inner radius, and the outer sidewall follows an outer radius;
   a plurality of vanes separating the transition region into channels, each of the plurality of vanes following an associated vane radius between the inner radius and the outer radius,
   wherein a major portion of a partially collimated input light beam having a divergence angle that enters the input region, exits the light duct from the output region within the divergence angle, wherein the divergence angle is less than about 30 degrees.

2. The light duct bend of claim 1, wherein each specular reflective surface within the interior cavity has a specular reflectivity greater than about 95 percent.

3. The light duct bend of claim 1, wherein the plurality of vanes are distributed uniformly between the inner radius and the outer radius.

4. The light duct bend of claim 1, wherein the plurality of vanes are distributed non-uniformly between the inner radius and the outer radius.

5. The light duct bend of claim 4, wherein each channel has a channel width such that a ratio of the channel width to the associated vane radius is constant.

6. The light duct bend of claim 1, wherein the light duct comprises a rectangular cross-section having a duct width between the inner sidewall and the outer sidewall, and the inner radius is about one-half the duct width.

7. The light duct bend of claim 6, wherein the light duct further comprises a duct height between the top and the bottom, and the duct height is about three-quarters the duct width.

8. The light duct bend of claim 1, wherein each vane comprises a first specular reflective surface and an opposing second specular reflective surface.

9. The light duct bend of claim 8, wherein the first specular reflective surface and the opposing second specular reflective surface each comprise a reflectivity of greater than 95 percent.

10. The light duct bend of claim 8, wherein the first specular reflective surface and the opposing second specular reflective surface each comprise a reflectivity of greater than 99 percent.

11. The light duct bend of claim 8, wherein the first specular reflective surface and the opposing second specular reflective surface each comprise an enhanced specular reflective (ESR) film.

12. The light duct bend of claim 1, wherein at least one of the plurality of vanes extend from the input region to the output region.

13. The light duct bend of claim 1, wherein the major portion of the partially collimated input light beam that exits the light duct from the output region within the divergence angle comprises at least about 80 percent of the partially collimated input light beam.

14. The light duct bend of claim 1, wherein the major portion of the partially collimated input light beam that exits the light duct from the output region within the divergence angle comprises at least about 85 percent of the partially collimated input light beam.

15. The light duct bend of claim 1, wherein the major portion of the partially collimated input light beam that exits the light duct from the output region within the divergence angle comprises at least about 88 percent of the partially collimated input light beam.

16. The light duct bend of claim 1, wherein the divergence angle is less than about 20 degrees.

17. The light duct bend of claim 1, wherein the divergence angle is less than about 25 degrees.

18. The light duct bend of claim 1, wherein the bend angle θ ranges from about 45 degrees to about 135 degrees.

19. The light duct bend of claim 1, wherein the bend angle θ is about 90 degrees.

20. The light duct bend of claim 1, wherein at least one of the inner sidewall, the outer sidewall, or at least one of the plurality of vanes are segmented.

21. A light duct assembly, comprising:
   a light source capable of injecting a partially collimated input light beam into a light duct, the light duct having an inner sidewall, an outer sidewall, a top, and a bottom, forming an interior cavity having specular reflective surfaces;
   an input region in the light duct, having a first light propagation direction;
   an output region in the light duct, having a second light propagation direction forming a bend angle θ with the first light propagation direction;
   a transition region connecting the input region to the output region, wherein the inner sidewall follows an inner radius, and the outer sidewall follows an outer radius;
   a plurality of vanes separating the transition region into channels, each of the plurality of vanes following an associated vane radius between the inner radius and the outer radius,
   wherein a major portion of the partially collimated input light beam having a divergence angle that enters the input region, exits the light duct from the output region within the divergence angle, wherein the divergence angle is less than about 30 degrees.

22. The light duct assembly of claim 21, wherein each channel has a channel width such that a ratio of the channel width to the associated vane radius is constant.

23. The light duct assembly of claim 21, wherein each vane comprises a first specular reflective surface and an opposing second specular reflective surface.

24. The light duct assembly of claim 21, wherein the major portion of the partially collimated input light beam that exits the light duct from the output region within the divergence angle comprises at least about 85 percent of the partially collimated input light beam.

25. The light duct assembly of claim 21, wherein the bend angle θ is about 90 degrees.

* * * * *

UNITED STATES PATENT AND TRADEMARK OFFICE
CERTIFICATE OF CORRECTION

PATENT NO. : 8,251,527 B1  
APPLICATION NO. : 13/025251  
DATED : August 28, 2012  
INVENTOR(S) : David G Freier Page 1 of 1

It is certified that error appears in the above-identified patent and that said Letters Patent is hereby corrected as shown below:

Title Page, item [56] Column 2  
Line 3, Delete "Technoloy" and insert -- Technology --, therefor.

In the Specifications

Column 4  
Line 32, Delete "degrees," and insert -- degrees. --, therefor.  
Line 37, Delete "$\varphi_i$" and insert -- $\varphi_1$ --, therefor.  
Line 43, Delete "$\varphi_i$." and insert -- $\varphi_1$. --, therefor.  
Line 47, Delete "$\varphi_i$" and insert -- $\varphi_1$ --, therefor.

Column 6  
Line 55, Delete "R1, R1" and insert -- Ri, R1 --, therefor.

Column 7  
Line 34, Delete "1a-1b" and insert -- 1A-1B --, therefor.  
Line 60, Delete ""ri"" and insert -- "Ri" --, therefor.

Signed and Sealed this  
Second Day of July, 2013

Teresa Stanek Rea  
*Acting Director of the United States Patent and Trademark Office*